United States Patent
Qian

(10) Patent No.: US 11,190,701 B2
(45) Date of Patent: *Nov. 30, 2021

(54) INTELLIGENT OBJECT TRACKING USING A REFLECTIVE LIGHT SOURCE

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,375

(22) Filed: Jan. 20, 2020

(65) Prior Publication Data

US 2020/0151887 A1 May 14, 2020

Related U.S. Application Data

(63) Continuation of application No. PCT/CN2018/096164, filed on Jul. 18, 2018, and a
(Continued)

(51) Int. Cl.
*H04N 5/225* (2006.01)
*H04N 5/232* (2006.01)
(Continued)

(52) U.S. Cl.
CPC ....... *H04N 5/23299* (2018.08); *F16M 11/041* (2013.01); *F16M 11/10* (2013.01);
(Continued)

(58) Field of Classification Search
CPC . G06T 7/246; G06T 7/73; G06T 2207/10016; F16M 13/04; F16M 11/041;
(Continued)

(56) References Cited

U.S. PATENT DOCUMENTS 5,227,985 A 7/1993 DeMenthon
10,587,813 B2 * 3/2020 Qian .................. F16M 11/18
(Continued)

FOREIGN PATENT DOCUMENTS

CN 1460187 A 12/2003
CN 101451836 A 6/2009
(Continued)

*Primary Examiner* — Robert Chevalier
(74) *Attorney, Agent, or Firm* — Osha Bergman Watanabe & Burton LLP

(57) ABSTRACT

A method for object tracking. The method includes capturing a sequence of images of a scene, detecting, by a hardware processor, based on a pattern of local light change across the sequence of images, a reflective light source in the scene, comparing, by the hardware processor in response to detecting the reflective light source, a location of the reflective light source in at least one image of the sequence of images and a target position within the at least one image to generate a result, and generating, by the hardware processor based on the result, a control signal for changing a field-of-view of a camera device such that the reflective light source substantially aligns with the target position within the field-of-view, wherein the reflective light source emits an object-reflected light.

20 Claims, 10 Drawing Sheets

Related U.S. Application Data continuation-in-part of application No. 16/025,761, filed on Jul. 2, 2018.

(51) Int. Cl.

| | | |
|---|---|---|
| *H04N 5/235* | (2006.01) | |
| *G01S 1/70* | (2006.01) | |
| *F16M 11/10* | (2006.01) | |
| *F16M 13/00* | (2006.01) | |
| *F16M 11/18* | (2006.01) | |
| *F16M 11/04* | (2006.01) | |
| *G01S 3/786* | (2006.01) | |
| *H04N 9/04* | (2006.01) | |
| *F16M 11/20* | (2006.01) | |
| *G06T 7/246* | (2017.01) | |
| *G06T 7/73* | (2017.01) | |
| *F16M 13/04* | (2006.01) | |
| *G01S 17/66* | (2006.01) | |
| *G03B 17/56* | (2021.01) | |
| *H04N 5/935* | (2006.01) | |
| *F16M 11/24* | (2006.01) | |

(52) U.S. Cl.
CPC ......... *F16M 11/18* (2013.01); *F16M 11/2014* (2013.01); *F16M 13/00* (2013.01); *F16M 13/04* (2013.01); *G01S 1/7038* (2019.08); *G01S 3/786* (2013.01); *G01S 17/66* (2013.01); *G03B 17/561* (2013.01); *G06T 7/246* (2017.01); *G06T 7/73* (2017.01); *H04N 5/2253* (2013.01); *H04N 5/2256* (2013.01); *H04N 5/232* (2013.01); *H04N 5/2354* (2013.01); *H04N 5/23216* (2013.01); *H04N 5/23218* (2018.08); *H04N 5/23238* (2013.01); *H04N 5/23261* (2013.01); *H04N 9/045* (2013.01); *F16M 11/205* (2013.01); *F16M 11/2064* (2013.01); *F16M 11/242* (2013.01); *F16M 2200/041* (2013.01); *F16M 2200/044* (2013.01); *G06T 2207/10016* (2013.01)

(58) Field of Classification Search
CPC ............. F16M 11/2064; F16M 11/205; H04N 5/2256; H04N 5/2253; H04N 5/23299; G01S 17/66; G03B 17/561
USPC ......... 348/169, 171, 172, 143; 386/210, 224
See application file for complete search history.

(56) References Cited

U.S. PATENT DOCUMENTS

| | | |
|---|---|---|
| 2004/0070565 A1 | 4/2004 | Nayar et al. |
| 2013/0120636 A1 | 5/2013 | Baer |
| 2015/0049211 A1 | 2/2015 | Lim |
| 2018/0007331 A1 | 1/2018 | Levcovich |
| 2018/0288295 A1 | 10/2018 | Scepanovic et al. |
| 2019/0082112 A1 | 3/2019 | Qian |

FOREIGN PATENT DOCUMENTS

| | | |
|---|---|---|
| CN | 102143324 A | 8/2011 |
| CN | 103810695 A | 5/2014 |
| CN | 105937904 A | 9/2016 |

\* cited by examiner

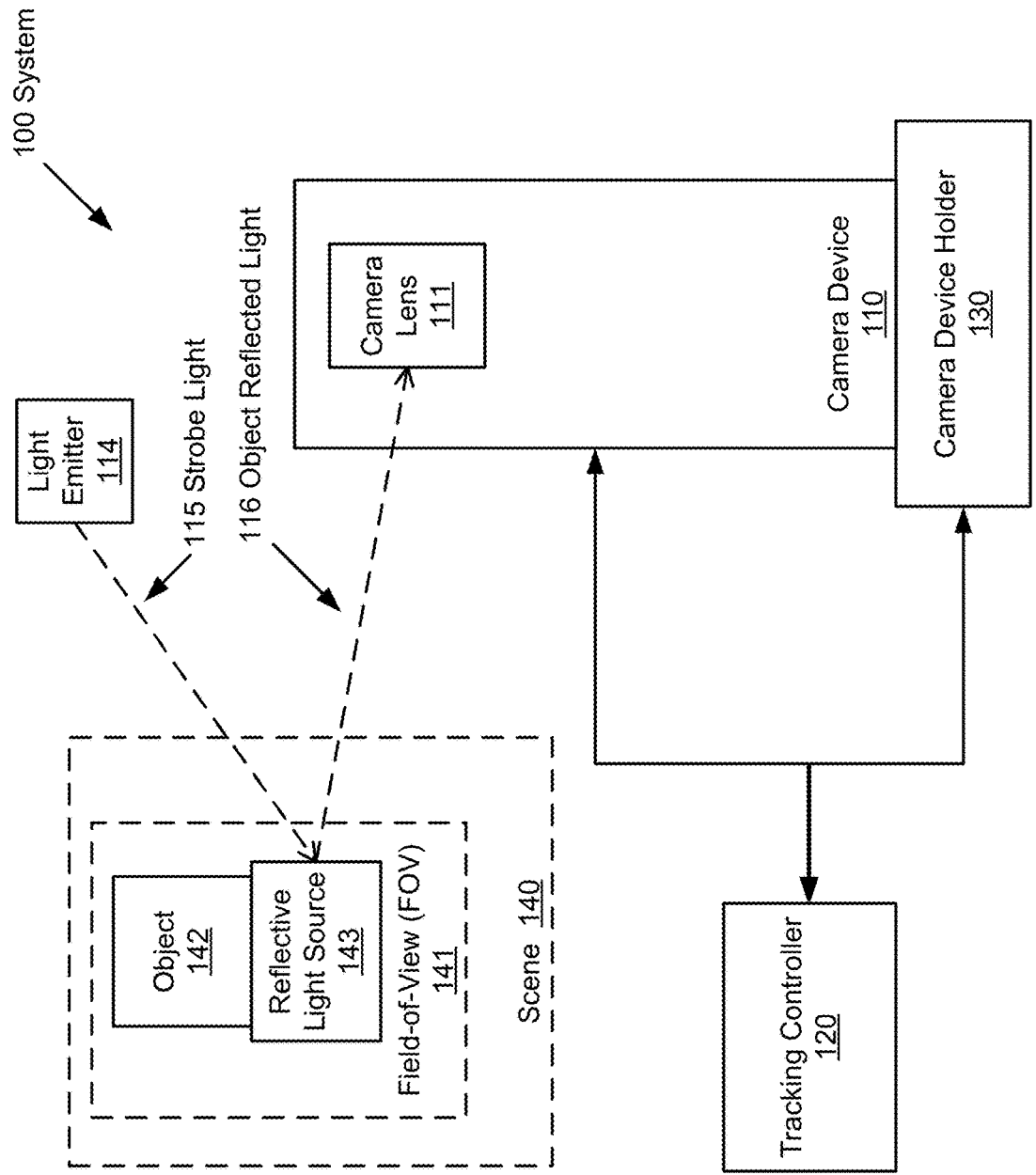
FIG. 1.1

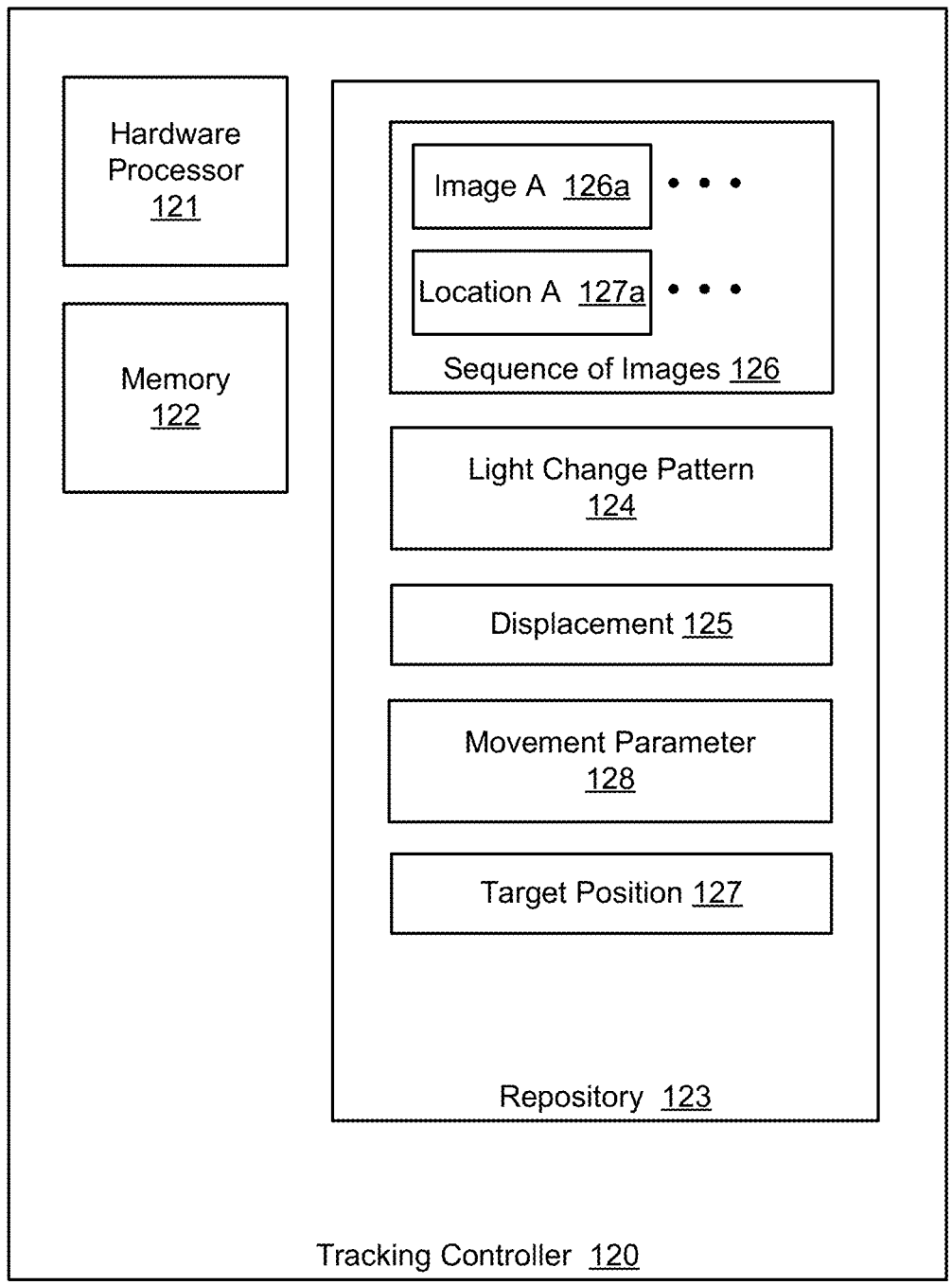
FIG. 1.2

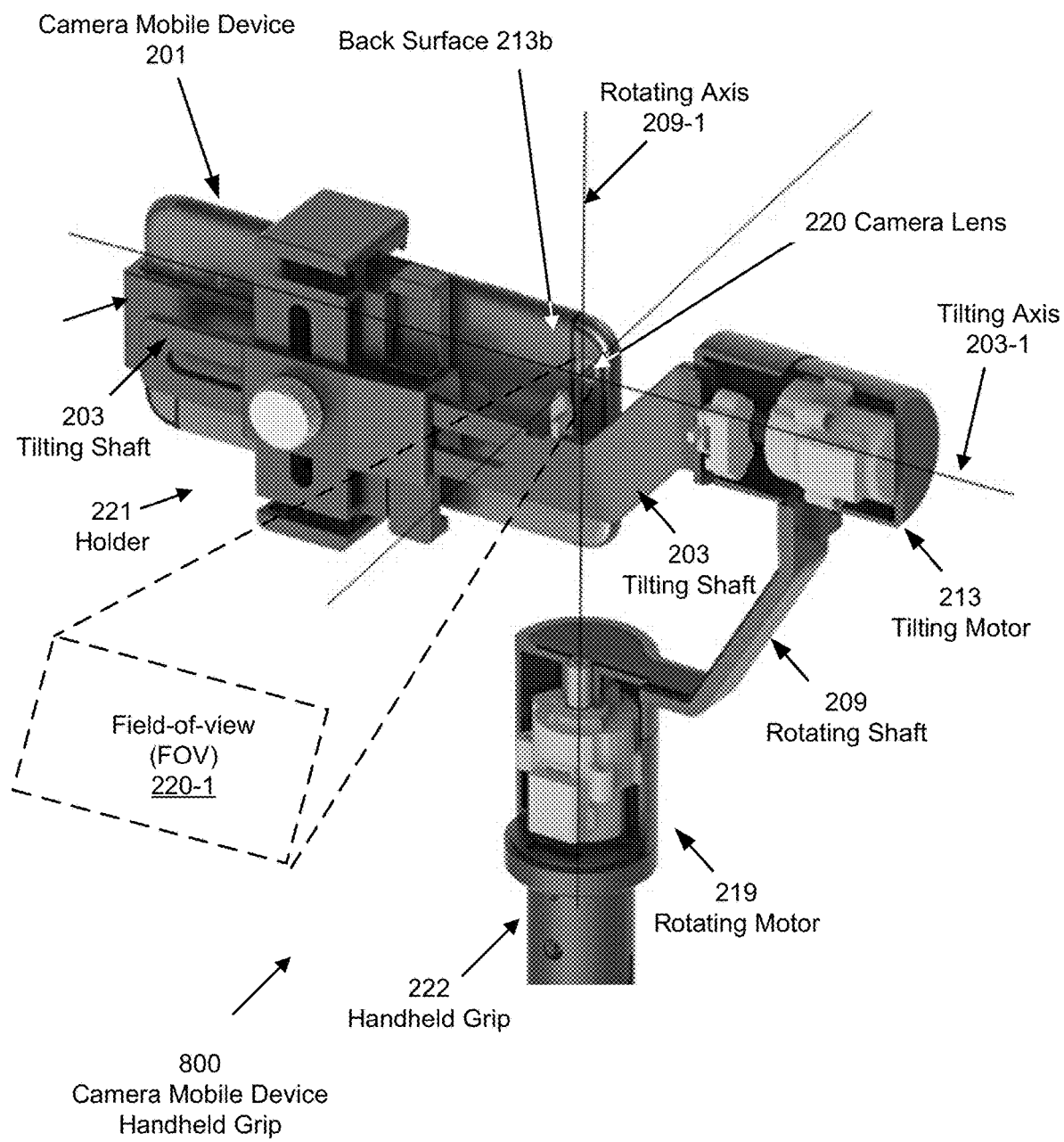
FIG. 3.1

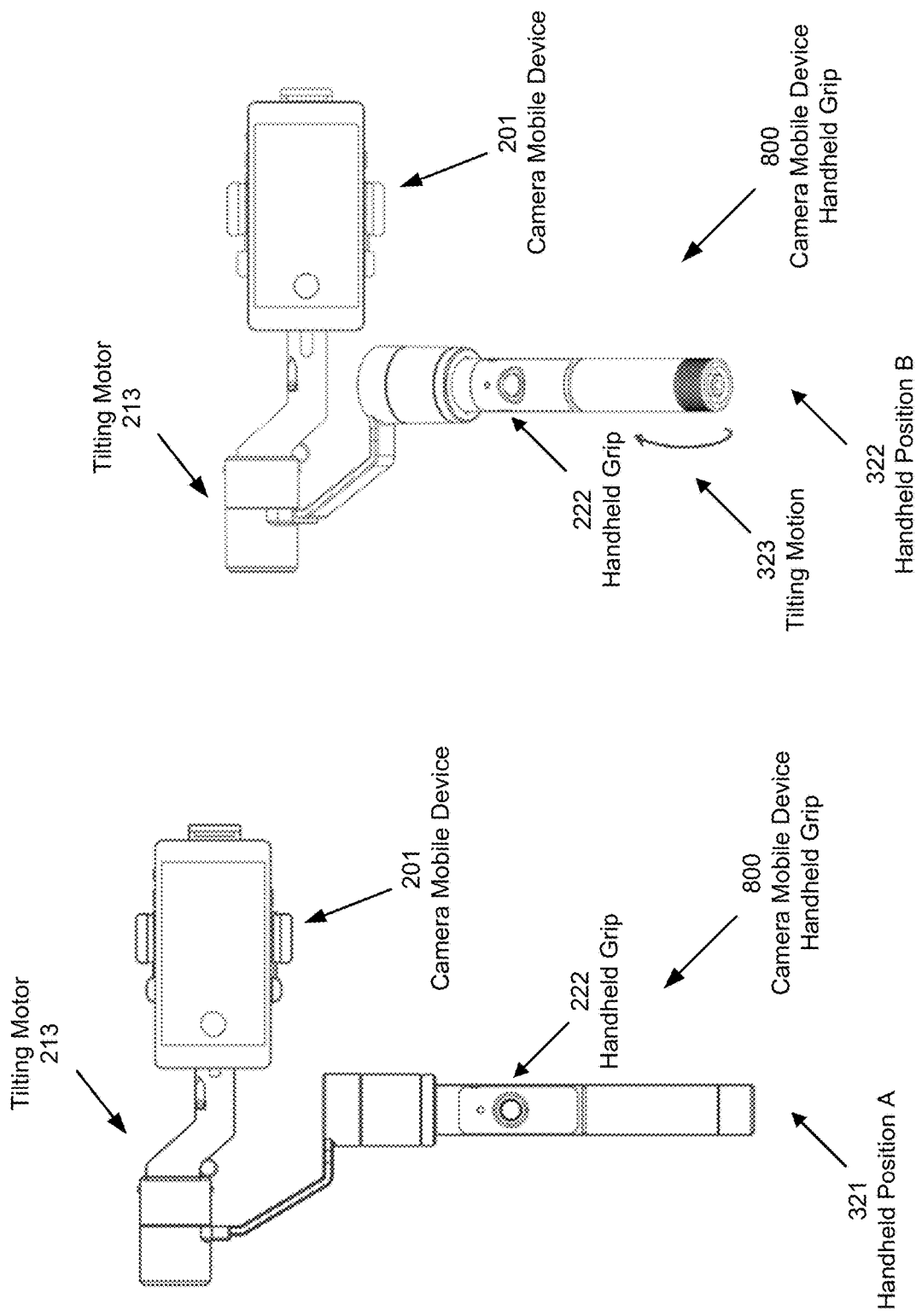
FIG. 3.2

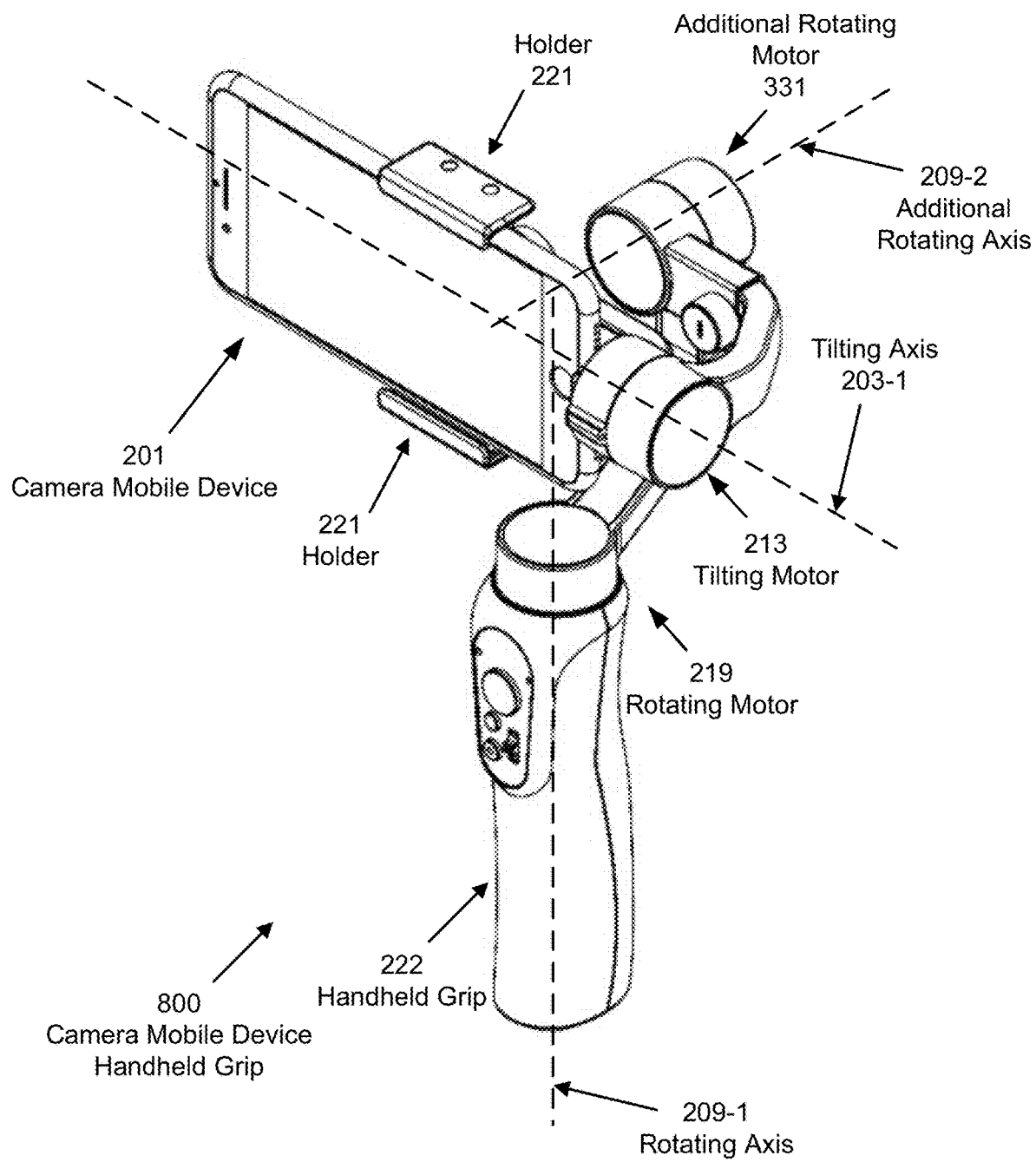
FIG. 3.3

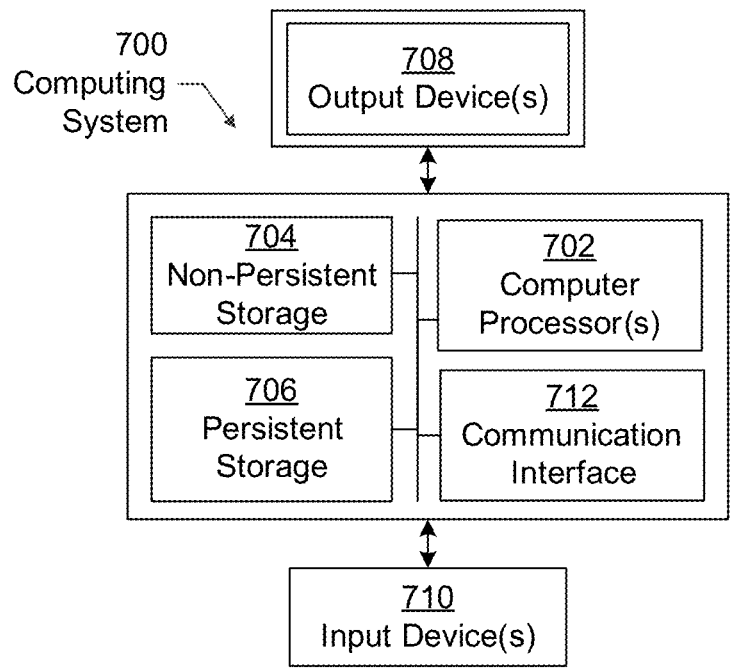
*FIG. 7.1*
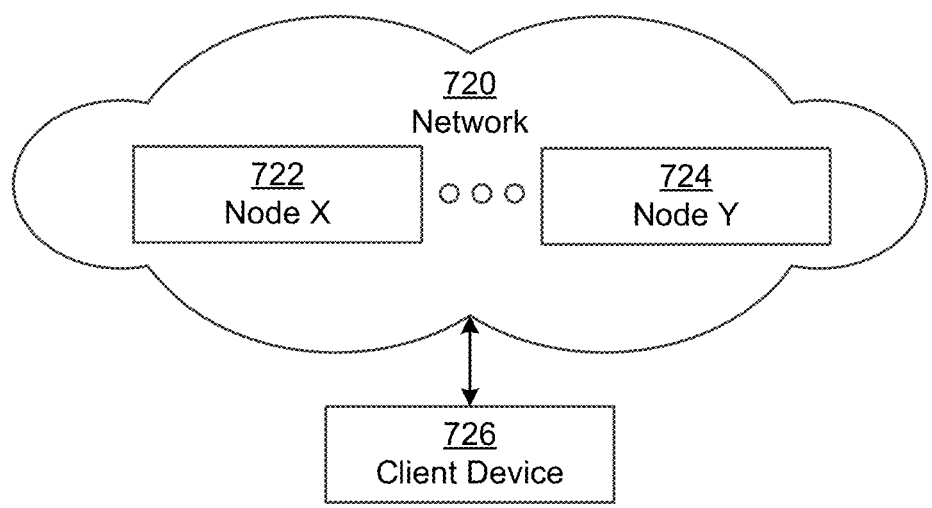
*FIG. 7.2*

US 11,190,701 B2

INTELLIGENT OBJECT TRACKING USING A REFLECTIVE LIGHT SOURCE

CROSS REFERENCES TO RELATED APPLICATIONS

This application is a continuation of PCT Application No. PCT/CN2018/096164, filed Jul. 18, 2018, which claims priority to PCT Application No. PCT/CN2017/093439, filed Jul. 18, 2017. The entire contents of these applications are incorporated herein by reference.

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

SUMMARY

In general, in one aspect, the invention relates to a method for object tracking. The method includes capturing a sequence of images of a scene, detecting, by a hardware processor, based on a pattern of local light change across the sequence of images, a reflective light source in the scene, comparing, by the hardware processor in response to detecting the reflective light source, a location of the reflective light source in at least one image of the sequence of images and a target position within the at least one image to generate a result, and generating, by the hardware processor based on the result, a control signal for changing a field-of-view of a camera device such that the reflective light source substantially aligns with the target position within the field-of-view, wherein the reflective light source emits an object-reflected light.

In general, in one aspect, the invention relates to a system for object tracking. The system includes a remote light emitter configured to emit a strobe light, a reflective region of an object, wherein the reflective region is configured to reflect the strobe light generated by the remote light emitter, and a tracking controller configured to obtain a sequence of images of a scene, detect, based on a pattern of local light change across the sequence of images, a reflective light source in the scene, compare, in response to detecting the reflective light source, a location of the reflective light source in at least one image of the sequence of images and a target position within the at least one image to generate a result, and generate, based on the result, a control signal for changing a field-of-view of a camera device such that the reflective light source substantially aligns with the target position within the field-of-view, wherein the reflective light source emits an object-reflected light produced by the strobe light reflected by the reflective region.

In general, in one aspect, the invention relates to a non-transitory computer readable medium storing instructions for object tracking. The instructions, when executed by a computer processor, comprising functionality for capturing a sequence of images of a scene, detecting, based on a pattern of local light change across the sequence of images, a reflective light source in the scene, comparing, in response to detecting the reflective light source, a location of the reflective light source in at least one image of the sequence of images and a target position within the at least one image to generate a result, and generating, based on the result, a control signal for changing a field-of-view of a camera device such that the reflective light source substantially aligns with the target position within the field-of-view, wherein the reflective light source emits an object-reflected light.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

FIGS. 3.1, 3.2, 3.3, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 2:
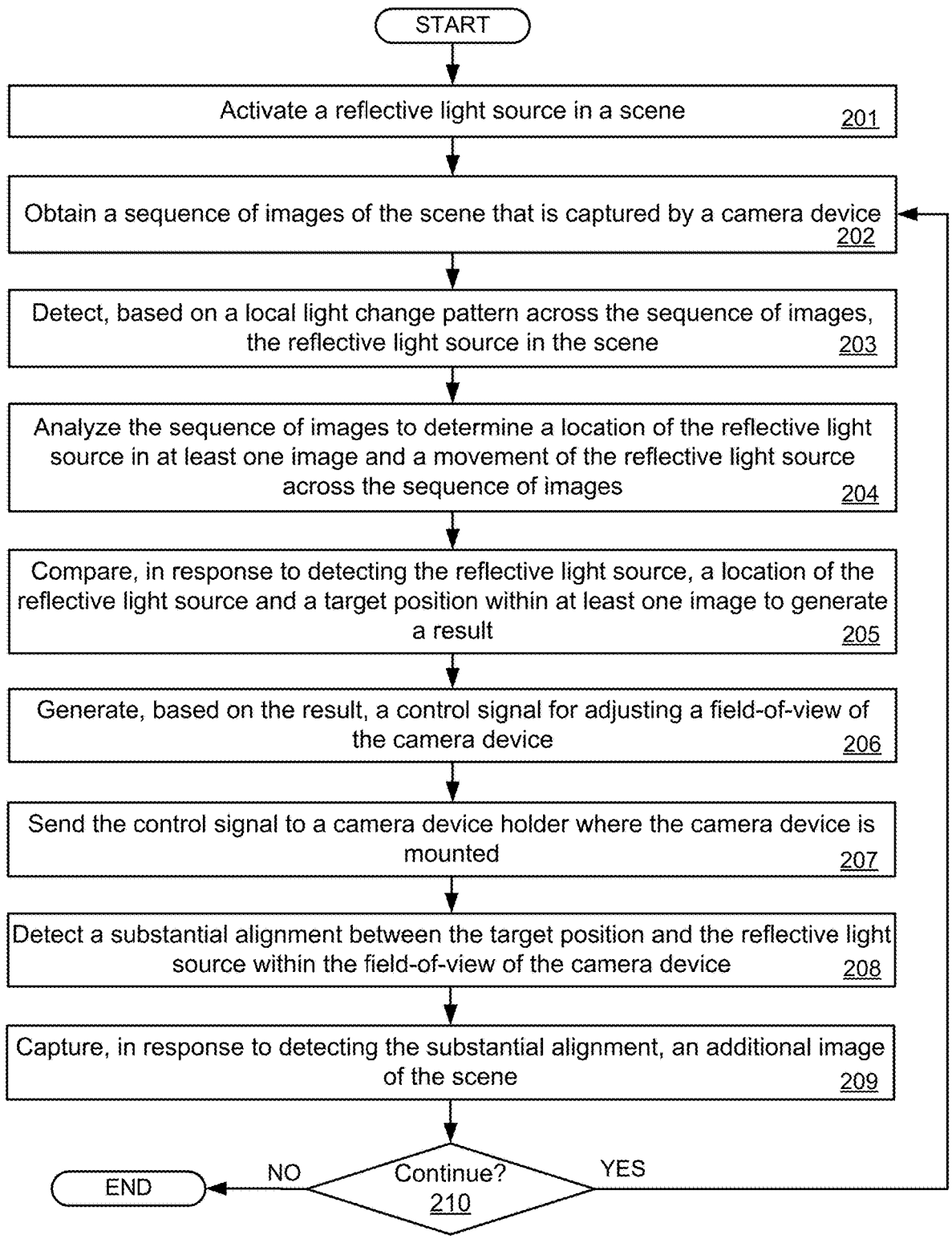
FIG. 2 shows a method flowchart in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for tracking an object in a field-of-view (FOV) of a camera device. In one or more embodiments of the invention, a reflective light source is attached to the object while a sequence of images corresponding to the FOV are captured. In one or more embodiments, the reflective light source is a reflective region that reflects a strobe light from a remote light emitter to produce a pattern of local intensity change across the sequence of images. Based on the pattern of local intensity change, the reflective light source is detected in the FOV. In response to detecting the reflective light source, a location of the reflective region and a target position within an image are compared to generate a result, such as a displacement or a movement parameter. Accordingly, a control signal is generated based on the result to control a camera device holder. Specifically, the camera device holder adjusts the FOV based on the control signal such that the reflective light source or the reflective region substantially aligns with the target position within the FOV. In one or more embodiments, the sequence of images is part of a video recording and the control signal causes the object to appear at the target position within the FOV in the video recording.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111), a tracking controller (120), a camera device holder (130), a scene (140), a field-of-view (FOV) (141) of the camera lens (111), an object (142) appearing within the FOV (141), a reflective light source (143) attached to the object (141), and a light emitter (114) emitting a strobe light (115) that shines on the reflective light source (143) to generate an object reflected light (116). Further, the camera device (110), tracking controller (120), and camera device holder (130) are communicatively coupled to each other. In one or more embodiments of the invention, two or more of the light emitter (114), camera device (110), tracking controller (120), and camera device holder (130) are integrated into a single device. For example, at least a portion of the tracking controller (120) may be included in the camera device (110). In another example, at least a portion of the tracking controller (120) may be included in the camera device holder (130). In still another example, one part of the tracking controller (120) is included in the camera device (110) while another part of the tracking controller (120) is included in the camera device holder (130). Similarly, the light emitter (114) may be integrated with the camera device (110), tracking controller (120), or camera device holder (130).

In one or more embodiments of the invention, the light emitter (114) is any device that emits light. For example, the light emitter (114) may emit light across a large angle (e.g., exceeding 45 degree plane angle, 1 square radian solid angle, etc.) as a flood light emitter. In another example, the light emitter (114) may emit a collimated light beam as a collimated light emitter. The light emitter (114) may be separate, e.g., by certain distance such as 1 meter or more, from the object (142) and referred to as a remote light source. In one or more embodiments, the light emitter (114) includes a light-emitting-diode (LED). In one or more embodiments, the strobe light (115) emitted by the light emitter (114) changes intensity and/or wavelength from time to time. For example, the strobe light (115) produces a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or wavelength change in the light. In one or more embodiments, the light emitter (114) produces a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light emitter (114) produces a light change pattern that is synchronized with the frame rate of the camera device (110). In one or more embodiments, the light emitter (114) emits an infrared light. In other words, the strobe light (115) has an infrared wavelength, e.g., between 700 nanometers (nm) and 1 millimeter (mm). Throughout this disclosure, the term "infrared wavelength" refers to a wavelength between 700 nm and 1 mm. In one or more embodiments, the light change pattern produced by the strobe light (115) represents encoded digital data. For example, the encoded digital data produced by an infrared strobe light (115) may be similar to an infrared remote control code.

In one or more embodiments of the invention, the reflective light source (143) is a reflective region of the object (142) that reflects the strobe light (115) to generate the object reflected light (116). In this context, the reflective light source (143) is said to emit the object reflected light (116). In other words, the reflective light source (143) emits the object reflected light (116) that is produced by the strobe light (115) reflected by the reflective region of the object (142). In one or more embodiments, the reflective region has a higher reflectance for infrared wavelength than for visible wavelength. For example, the higher reflectance may be based on reflective material with a higher reflectivity for infrared wavelength than for visible wavelength. While both the strobe light (115) and ambient light (not shown) shine on the reflective region, the object reflected light (116) may have higher infrared reflected content from the strobe light (115) than visible reflected content from ambient visible light. In one or more embodiments, the object (142) is a human, animal, robot, or any other moving item, and the reflective light source (143) includes a reflective material attached to the object (142). For example, the reflective material may be part of a wrist band, arm band, belt, finger ring, pendant, necklace, hat, glove, clothing, etc. worn by or otherwise attached to the human, animal, robot, or any other moving item. In one or more embodiments, the reflective material may include metal, dielectric material, or a combination of metal and dielectric material. In one or more embodiments, the reflective material may be a coating layer or painted film on the surface of the aforementioned wrist band, arm band, belt, finger ring, pendant, necklace, hat, glove, clothing, etc. For example, the coating layer or painted film may include infrared reflective pigments such as titanium dioxide. In particular, the titanium dioxide may have a reflectance exceeding 75% for the infrared wavelength.

In one or more embodiments, the reflective material includes a geometric pattern having geometrically varying reflectivity for infrared wavelength to produce a geometric light change pattern. In particular, the geometric pattern of the reflective material produces a spatial variation of the object reflected light that is captured by the camera lens as additional distinction from ambient light. In other words, the geometric pattern enhances the accuracy of detection of the reflective light source. As used herein, geometric light change pattern is a pattern of intensity change in the light according to the geometric pattern. For example, the geometric pattern may be created by surface coating/painting using the aforementioned infrared reflective pigments such as titanium dioxide. In one or more embodiments, the object reflected light (116) from the reflective light source (143) includes time modulation based on the aforementioned light change pattern originated from the light emitter (114) and/or spatial modulation based on the geometric light change pattern of the reflective light source (143).

In one or more embodiments, a second light emitter (not shown) with a different wavelength compared to the light emitter (114) may be disposed near the light emitter (114). When the light emitter (114) is activated, the second light emitter may also be activated, specifically in case there is an object having total reflection characteristics, e.g., a mirror, that is not intended to be tracked in the scene. In one or more embodiments, the light emitter (114) may be an infrared light source and the second light emitter may be a visible light source emitting, e.g., green, blue or red color light. In one or more embodiments, the light emitter (114) and the second light emitter may emit a strobe light alternately before tracking an object. In other words, before the tracking of the object is started, the light emitter (114) may emit a strobe light at time t0, t2, t4, etc., and the second light emitter may emit a strobe light at time t1, t3, t5, etc. where t0, t1, t2, t3, t4, t5, etc. represents sequential time points. During these periods of time, the camera device will turn around to record images of the scene so as to set up space coordinates of the scene, and identify reflective regions having total reflection characteristics and reflective regions of the reflective material described above. Specifically, considering a scene with a mirror and an object with the reflective material described above, if the camera device detects a pixel(s) that is both sensitive to the light emitter (114) and the second light emitter, then the pixel(s) may be determined as corresponding to the mirror; if the camera device detects a pixel(s) that is only sensitive to the light emitter (114), then the pixel(s) may be determined as corresponding to the object with the reflective material described above. In one or more embodiments, the second light emitter will be deactivated when the tracking is started. With such configuration, the system (100) identifies the reflective regions having total reflection characteristics, e.g., a mirror in the scene, and thus the reflective regions having total reflection characteristics are ignored when tracking the object. Thus the detection accuracy and range of the system (100) may be enhanced.

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone.

In one or more embodiments, the scene (140) is a place where an action or event, imaged by the camera device (110), occurs. The field-of-view (FOV) (141) is an extent of the scene (140) that is imaged by the camera device (110) using the camera lens (111). In other words, an object (e.g., object (142)) inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to the scene (140). In one or more embodiments, the object (142) may move across the scene (140) during the action or event. Object tracking is the action causing the camera lens (111) to be oriented toward, zoomed with respect to, or otherwise positioned relative to the scene (140) such that the object (142) is continuously within the FOV (141), or a target position within the FOV (141), during image captures. Throughout this disclosure, the terms "object tracking" and "tracking" may be used interchangeably. In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments of the invention, the camera device holder (130) is configured to mechanically hold the camera device (110) and to adjust, in response to a control signal from the tracking controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3.1, 3.2, and 3.3 below.

In one or more embodiments, the tracking controller (120) includes a hardware component, a software component, or a combination thereof that is configured to adjust the FOV (141) of the camera lens (111). For example, the tracking controller (120) may control the FOV (141) by way of controlling the camera device holder (130). In another example, the tracking controller (120) may further control the FOV (141) by way of controlling a zoom level of the camera lens (111). In one or more embodiments, the tracking controller (120) controls the FOV (141) such that the object (142) appears in a target position within the FOV (141). In one or more embodiments, the tracking controller (120) controls the FOV (141) using the method described in reference to FIG. 2 below. In one or more embodiments, the tracking controller (120) includes the components described in reference to FIG. 1.2 below.

FIG. 1.2 shows details of the tracking controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the tracking controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform FOV adjustment functionalities of the camera device (110) depicted in FIG. 1.1 above. In one or more embodiments, the tracking controller (120) performs the FOV adjustment functionalities according to the method flowchart described in reference to FIG. 2 below. In one or more embodiments, the memory (122) stores instructions to perform one or more portions of the method flowchart described in reference to FIG. 2 below. In one or more embodiments, the tracking controller (120) and the camera device (110) are integrated into a single device. In such embodiments, the instructions to perform one or more portions of the method flowchart described in reference to FIG. 2 are part of a mobile application, or mobile app, which is a user-installable software application designed to run on a smart phone or other mobile devices.

Further as shown in FIG. 1.2, the repository (123) includes a sequence of images (126), a light change pattern (124), a displacement (125), a movement parameter (128), and a target position (127). In particular, the sequence of images (126) includes consecutive images (e.g., image A (126a)) captured by the camera device (111). For example, the image A (126a) corresponds to a portion of the scene (140) that is covered by the FOV (141) at a particular time point. The light change pattern (124) is a pattern of light intensity and/or wavelength alternating between different intensity levels and/or wavelengths across the sequence of images (126). In one or more embodiments, the light change pattern (124) corresponds to a spot in each image of the sequence of images (126). For example, the spot may be defined by a pixel position or a collection of connected pixel positions in each image. In this context, the light change pattern (124) is referred to as a local light change pattern captured by the camera device (111). In one or more embodiments, the light change pattern (124) is caused by a strobe light reflected by the reflective light source (143) and indicates a location of the reflective light source (143) within each image. In other words, the location of the reflective light source (143) within each image may be determined based on where the light change pattern (124) is found across the sequence of images (126). For example, the light change pattern (124) indicates that the reflective light source (143) is at the location A (127a) in the image A (126a). Similarly, each other image in the sequence of images (126) is associated with a location of the reflective light source (143). The target position (127) is a pre-determined position that the tracking controller (120) is configured for tracking the object (142). For example, the target position (127) may be defined as the center of the FOV (141), which corresponds to the center of each image of the sequence of images (126). In other words, the tracking controller (120) is configured to adjust the FOV (141) such that the object (142) appears at the center (i.e., target position (127)) in the image after the adjustment. In other examples, the target position (127) may be defined as different positions from the center of the FOV (141). The displacement (125) is the distance between the target position (127) and the location (e.g., location A (127a)) of the reflective light source (143) within an image. In one or more embodiments, the displacement (125) includes a horizontal direction distance and a vertical distance. The displacement (125) may be represented based on a number of pixels or any other suitable distance scale. In one or more embodiments, the object (142) may be a moving object such that the location (e.g., location A (127a)) of the reflective light source (143) may vary from one image to next in the sequence of images (126). In such embodiments, the movement parameter (128) is a rate of change of the location (e.g., location A (127a)) of the reflective light source (143) over time. For example, the movement parameter (128) may include a change in the location (e.g., location A (127a)) of the reflective light source (143) from one image to next in the sequence of images (126). Depending on the moving direction of the object (142), the movement parameter (128) may include a horizontal portion and a vertical portion. Mathematically, the movement parameter (128) corresponds to a derivative of the displacement (125) over time.

In one or more embodiments, the tracking controller (120) performs the FOV adjustment functionalities based on the sequence of images (126), light change pattern (124), displacement (125), movement parameter (128), and target position (127) described above. Specifically, the tracking controller (120) performs the FOV adjustment functionalities using the method described in reference to FIG. 2 below. An example of the sequence of images (126), light change pattern (124), displacement (125), and movement parameter (128) is described in reference to FIGS. 4-6 below.

FIG. 2 shows a flowchart in accordance with one or more embodiments. The process shown in FIG. 2 may be executed, for example, by one or more components discussed above in reference to FIGS. 1.1 and 1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, a reflective light source within a scene is activated. In one or more embodiments of the invention, the reflective light source is a reflective region attached to an object in the scene. In such embodiments, the reflective light source is activated by using a remote light emitter to emit and project a strobe light onto the reflective region. For example, the strobe light is emitted with a free-running light pattern when the remote light emitter is turned on. As a result, the strobe light is reflected by the reflective region to generate object reflected light having the same free-running light pattern. In one or more embodiments, the strobe light and the object reflected light have a low repetition rate (e.g., 10 hertz, 20 hertz, etc.) comparing to a frame rate of a camera device. In one or more embodiments, the strobe light and the object reflected light are synchronized with the frame rate of the camera device. For example, the strobe light may be initiated and/or synchronized based on a trigger signal sent from a tracking controller and/or the camera device.

In one or more embodiments, a second light source may be a reflective region having total reflection characteristics on an object that is not intended to be tracked in the scene. In such embodiments, the second light source is activated by using a second light emitter to emit and project a strobe light with a different wavelength compared to the strobe light onto the reflective region of the reflective light source. When the reflective light source within a scene is activated, the second light source may also be activated simultaneously. In one or more embodiments, the reflective light source and the second light source may emit a reflected light alternately before tracking an object. The camera device then turns around to capture images of the scene to set up space coordinates of the scene, identifies and ignores the reflective region having total reflection characteristics. In one or more embodiments, the second light source is deactivated when the tracking is started.

In Step 202, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the reflective light source emits the object reflected light. In one or more embodiments, the frame rate of the sequence of images is selected based on the duty cycle and/or repetition rate of the reflective light source such that consecutive images (or a pair of images with a particular separation in the sequence) include alternating bright level and dark level, and/or alternating wavelengths from the remote light emitter and reflective light source. For example, the remote light emitter and reflective light source may be free running and the frame rate is selected based on the duty cycle and/or repetition rate of the free running reflective light source. In one or more embodiments, the duty cycle and/or repetition rate of the remote light emitter and reflective light source is selected based on the frame rate of the sequence of images such that consecutive images (or a pair of images with a particular separation in the sequence) include alternating bright level and dark level, and/or alternating wavelengths from the remote light emitter and reflective light source. For example, the frame rate may be pre-determined and the reflective light source is synchronized to the frame rate, e.g., based on a trigger signal from the camera device.

In Step 203, based on a local light change pattern across the sequence of images, the reflective light source is detected in the scene. Specifically, the strobe light reflected from the reflective light source causes changes in light intensity and/or wavelength received by an optical sensor of the camera device resulting in the local light change pattern across the sequence of images. In one or more embodiments, the intensity of the strobe light is adjusted to control the size of the location where the local light change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating wavelengths, in consecutive images, as recognized by the optical sensor of the camera device, exceeds a pre-determined threshold. In one or more embodiments, the location is referred to as the location of the reflective light source in the image.

In one or more embodiments, a pair of images in the sequence of images are compared by subtraction of intensity and/or wavelength values of corresponding pixels. Specifically, the intensity and/or wavelength values are generated by the optical sensor. For example, the intensity values may correspond to pixel output values of a monochrome CMOS (complementary metal oxide semiconductor) sensor. In another example, output values of RGB CMOS sensor may be analyzed to determine the wavelength value of each pixel. In particular, the intensity and/or wavelength value of a pixel in one image is subtracted from the intensity and/or wavelength value of the corresponding pixel in another image to generate a subtraction result. The pixel where the difference in alternating bright level and dark level, and/or alternating wavelengths, is found in the subtraction result is selected as part of the location of the reflective light source in the image. Depending on the duty cycle/repetition rate of the reflective light source versus the frame rate of the sequence of images, the pair of images may be consecutive images or two images separated by a particular number of images, such as every three images, etc.

In Step 204, the sequence of images is analyzed to determine a location of the reflective light source in at least one image and a movement of the reflective light source across the sequence of images. In one or more embodiments, the location of the reflective light source is determined based on where the difference in alternating bright level and dark level, and/or alternating wavelengths in the sequence of images, as recognized by the optical sensor of the camera device, exceeds the pre-determined threshold. In one or more embodiments, the movement of the reflective light source is determined based on a rate of change of the location over the sequence of images.

In Step 205, in response to detecting the reflective light source, the location of the reflective light source and a target position within at least one image are compared to generate a result. In one or more embodiments, the result includes the displacement between the location and the target position. In one or more embodiments, the displacement may vary from one image to next in the sequence of images, indicating that the object is a moving object. In such embodiments, the rate of change of the displacement over time, e.g., from one image to next, is computed as a movement parameter.

In Step 206, a control signal is generated based on the result for orienting the camera device. In one or more embodiments, the control signal is configured to adjust the orientation of the camera lens in the opposite direction to the displacement. In one or more embodiments, the control signal is configured to adjust the relative position of the camera with respect to the scene in the opposite direction to the displacement. In one or more embodiments, the movement parameter is considered in fine tuning the amount of adjustment caused by the control signal.

In Step 207, the control signal is sent to a camera device holder (e.g., a camera handheld grip, a tilt-and-swivel device, etc.) where the camera device is mounted. Accordingly, the orientation of the camera lens or a relative position of the camera device is adjusted in the opposite direction to the displacement.

In Step 208, a substantial alignment between the target position and the reflective light source is detected within the FOV of the camera device. In particular, the substantial alignment is a result of adjusting the orientation of the camera lens or a relative position of the camera device in the opposite direction to the displacement.

In Step 209, in response to detecting the substantial alignment, an additional image of the scene is captured. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the additional image. As time passes, the additional image becomes part of an updated sequence of images for generating an updated control signal to continuously track the object in the FOV.

In one or more embodiments, the sequence of images that is analyzed to generate the control signal is designated as control information without being outputted by the camera device. In contrast, the additional image where the reflective light source (hence the object) substantially aligns with the target position is outputted by the camera device. For example, the control information may be stored separate from the additional image until being discarded or otherwise removed from the camera device.

In Step 210, a determination is made as to whether image capturing is to continue. If the determination is positive, i.e., the image capturing is to continue, the method returns to Step 202. If the determination is negative, i.e., the image capturing is not to continue, the method ends.

FIGS. 3.1, 3.2, 3.3, 4, 5, and 6 show various examples in accordance with one or more embodiments of the invention. The examples shown in FIGS. 3.1, 3.2, 3.3, 4, 5, and 6 may be, for example, based on one or more components depicted in FIGS. 1.1 and 1.2 above and the method flowchart depicted in FIG. 2.1 above. In one or more embodiments, one or more of the modules and elements shown in FIGS. 3.1, 3.2, 3.3, 4, 5, and 6 may be omitted, repeated, and/or substituted. Accordingly, embodiments of the invention should not be considered limited to the specific arrangements of modules shown in FIGS. 3.1, 3.2, 3.3, 4, 5, and 6.

FIG. 3.1 shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the orientation controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the orientation controller (120) via the communication interface. Similarly, the tilting shaft (203) is rotatable by the tilting motor (213) around a tilting axis (203-1) in response to the control signal received from the orientation controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220). Although the example shown in FIG. 3.1 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.3. Specifically, FIG. 3.3 shows a camera mobile device handheld grip (800) with three motors as an example of the camera device holder (130) depicted in FIG. 1.1 above.

FIG. 3.2 shows an example of stabilizing the camera mobile device handheld grip (800) depicted in FIG. 3.1 above. For example, the orientation of the camera mobile device (201) is stabilized when the camera mobile device handheld grip (800) is changed from the handheld position A (321) to the handheld position B (322) or changed from the handheld position B (322) to the handheld position A (321). As shown in FIG. 3.2, the handheld position A (321) corresponds to a vertical orientation (i.e., along the earth gravity direction) of the handheld grip (222). In the handheld position A (321), the tilting motor (213) maintains the camera mobile device (201) pointing toward the earth horizon (i.e., orthogonal to the earth gravity direction). In other words, the imaging plane of the camera mobile device (201) is orthogonal to the earth horizon.

The handheld position B (322) corresponds to a tilted orientation (i.e., deviating from the earth gravity direction) of the handheld grip (222). For example, the tilting motion (323) of the handheld grip (222) is exerted by the user's hand. In the handheld position B (322), the tilting motor (213) maintains the camera mobile device (201) pointing toward the earth horizon as in the handheld position A (321).

Figure 4:
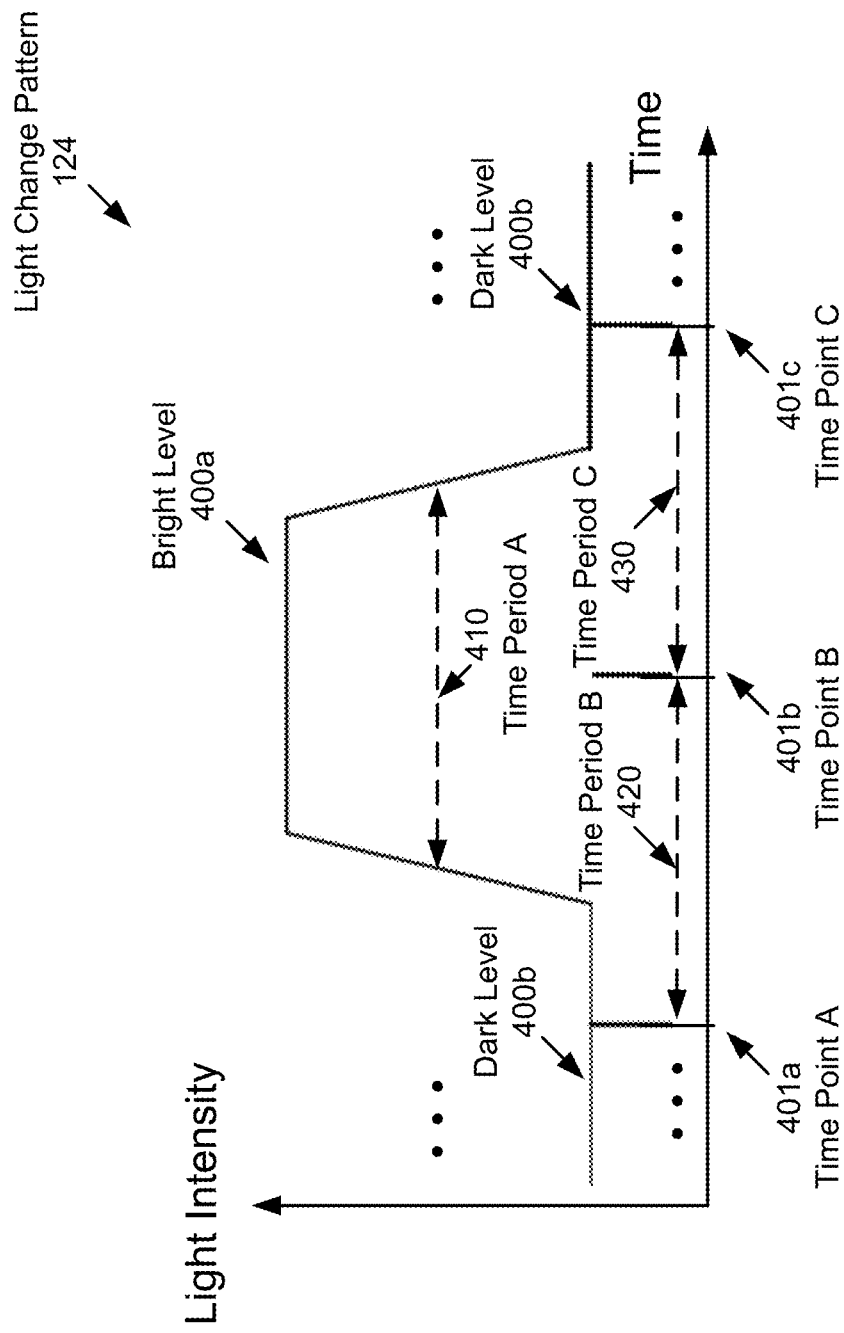

FIG. 4 shows an example of the light change pattern (124) of the reflective light source (143) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of images is captured by a camera device periodically. For example, consecutive images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). The alternating sequence of dark level (400b) captured at time point A (401a), bright level (400a) captured at time point B (401b), dark level (400b) captured at time point C (401c), etc. forms the aforementioned local light change pattern captured by the camera device. Although the light change pattern (124) depicted in FIG. 4 is a pattern of light intensity changes, the light change pattern (124) may also include wavelength changes in other examples. In other words, the bright level (400a) and dark level (400b) may be substituted or supplemented by different wavelengths to represent wavelength changes.

Figure 5:
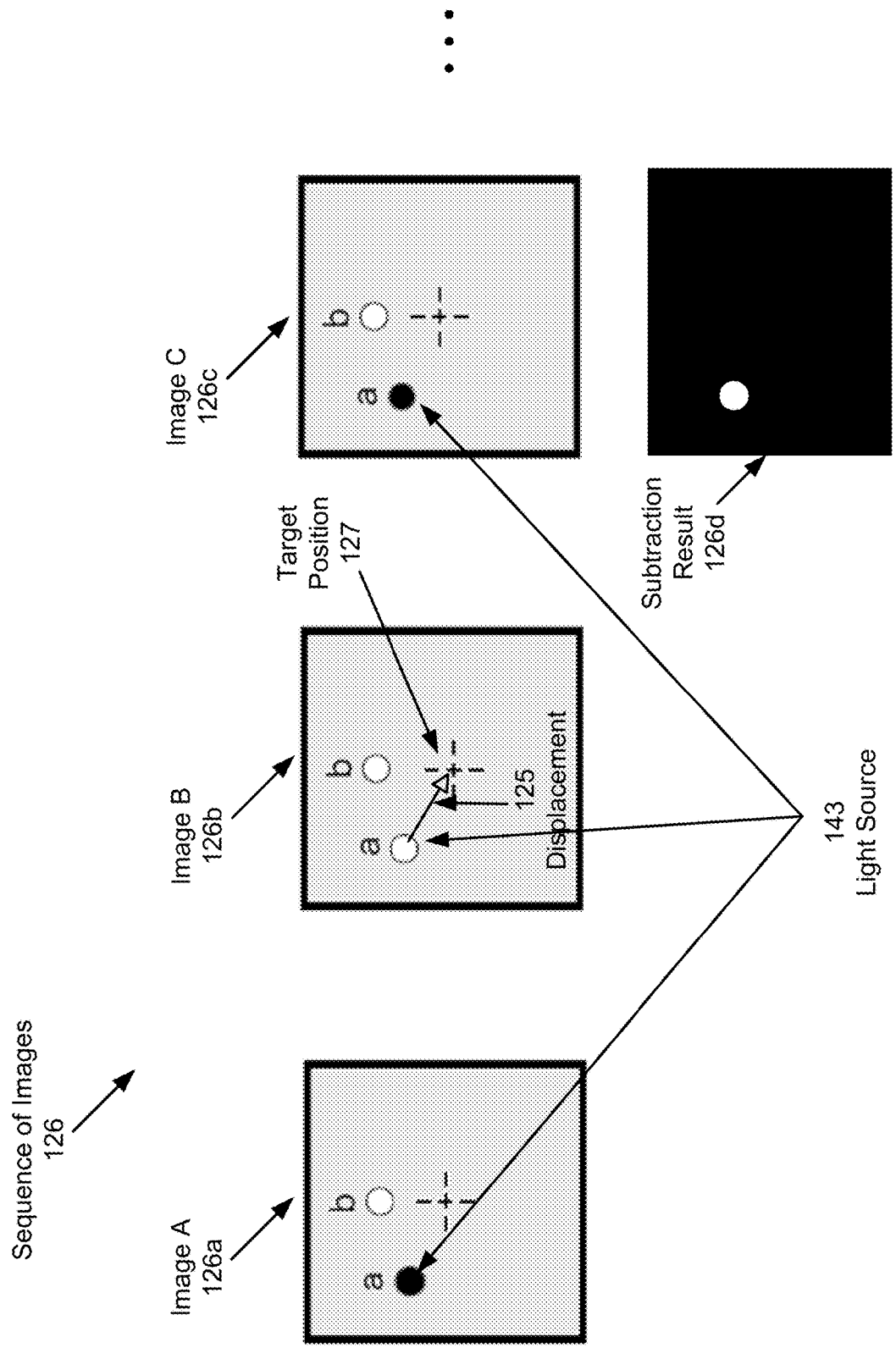

FIG. 5 shows an example of the sequence of images (126) of the scene (140) depicted in FIGS. 1.1 and 1.2 above. As shown in FIG. 5, the sequence of images (126) includes the image A (126a), image B (126b), image C (126c), etc. that are captured at the time point A (401a), time point B (401b), time point C (401c), etc. depicted in FIG. 4 above. According to the example of the light change pattern (124) described in reference to FIG. 4 above, the reflective light source (143) appears as an alternating dark and bright spot at a location marked "a" in the image A (126a), image B (126b), image C (126c), etc. In contrast, the light intensity remains substantially constant at another location marked "b" in the image A (126a), image B (126b), image C (126c), etc. For example, the location marked "a" may be determined by subtracting intensity values of corresponding pixels in the image A (126a) and image B (126b) to generate the subtraction result (126d). Similarly, the location marked "a" may be further determined by subtracting intensity values of corresponding pixels in the image B (126b) and image C (126c) to generate the subtraction result (126d). In the subtraction result (126d), black color indicates no difference and white color indicates a non-zero difference or a difference exceeding the aforementioned pre-determined threshold. Accordingly, the location of the reflective light source corresponds to the white spot in the subtraction result (126d).

Further as shown in FIG. 5, the center of each image is defined as the target position (127). Accordingly, the distance from the location marked "a" to the target position (127) corresponds to the displacement (125). The location marked "a", the target position (127), and the displacement (125) shown in FIG. 5 are examples of the location A (127a), target position (127), and the displacement (125), respectively, depicted in FIG. 1.2 above. In one or more embodiments, the location marked "a" varies between the image A (126a), image B (126b), image C (126c), etc. The rate of change of the location marked "a" across image A (126a), image B (126b), image C (126c), etc. corresponds to the movement parameter (128) depicted in FIG. 1.2 above.

Figure 6:
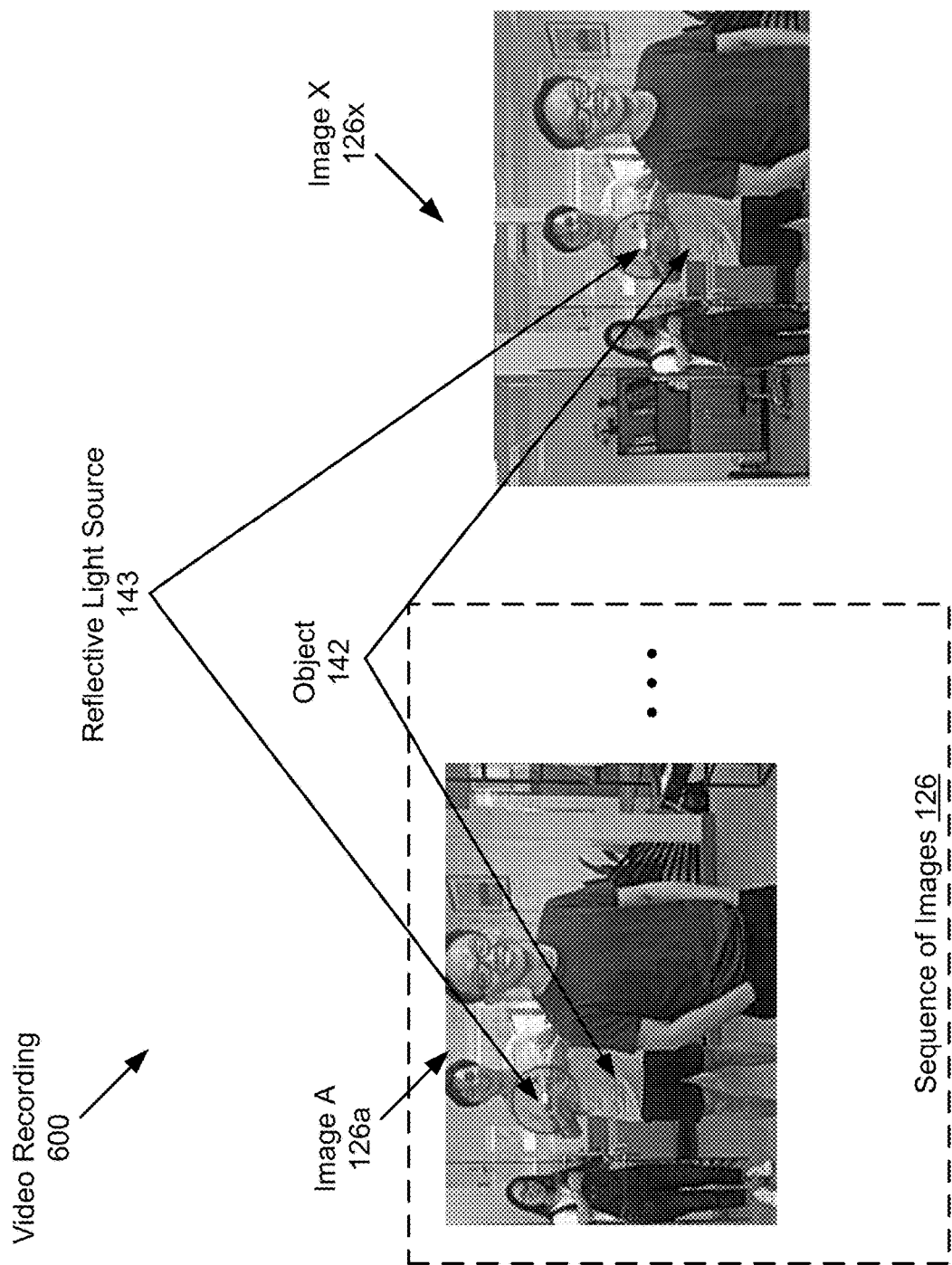

FIG. 6 shows an example video recording (600) that includes the example of the sequence of images (126) described in reference to FIG. 4 above. In an example scenario, the target position is the center of the image. As shown in FIG. 6, the reflective light source (143) is identified at a location in the left portion of the images (e.g., image A (126a)) in the sequence of images (126). In particular, the reflective light source (143) is reflective material included in a finger ring or part of a wrist band worn by a male person (i.e., object (142)). For example, the location of the reflective light source (143) is identified based on the alternating dark and bright spot in the image A (126a), image B (126b), image C (126c), etc. depicted in FIG. 5 above. In other words, the reflective light source (143) corresponds to the location marked "a" in the image A (126a), image B (126b), image C (126c), etc. depicted in FIG. 5. Because the target position (i.e., image center) is to the right of the reflective light source location, the tracking controller (120) is configured to orient the camera device (110) toward the left such that the male person (i.e., object (142)) holding the reflective light source (143) appears in the center of the image. Accordingly, the orientation of the camera device (110) is adjusted based on the identified location "a" of the reflective light source (143) such that the object (142) appears in the center of the image X (126x).

To improve accuracy of object tracking, in addition to detecting the location of the reflective light source (143) based on the alternating dark and bright spot in the image A (126a), image B (126b), image C (126c), etc. depicted in FIG. 5 above, the geometric shape of the alternating dark and bright spot is qualified based on matching the geometric shape of the reflective material included in a finger ring or part of a wrist band worn by a male person (i.e., object (142)). In other words, any alternating dark and bright spot in the image A (126a), image B (126b), image C (126c), etc. that does not match the geometric shape of the reflective pattern is excluded in identifying the reflective light source (143).

In an example to improve accuracy of object tracking using a visible light emitter in addition to the infrared light emitter, an alternating dark and bright spot in the visible wavelength is detected in the image A (126a), image B (126b), image C (126c), etc. as a mirror on the wall in the scene. The mirror is excluded from detecting the location of the reflective light source (143).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for object tracking, comprising:
   capturing, using a single optical sensor of a camera device, a sequence of images of a scene;
   detecting, based on a pattern of local light change across the sequence of images captured by the single optical sensor, a reflective light source in the scene;
   comparing, in response to detecting the reflective light source, a location of the reflective light source in at least one image of the sequence of images and a target position within the at least one image to generate a result; and
   generating, based on the result, a control signal for changing a field-of-view of the camera device such that the reflective light source aligns with the target position within the field-of-view,
   wherein the reflective light source emits an object-reflected light,
   wherein the pattern of local light change identifies at least a first pixel position in the at least one image as the location of the reflective light source,
   wherein the target position corresponds to at least a second pixel position in the at least one image, and
   wherein the result comprises a pixel position displacement between at least the first pixel position of the reflective light source and at least the second pixel position of the target position.

2. The method of claim 1,
   wherein the reflective light source is a reflective region of an object, and
   wherein the object-reflected light is produced by a strobe light emitted from a remote light emitter and reflected by the reflective region.

3. The method of claim 2, wherein detecting the reflective light source in the scene comprises:
   detecting the pattern of local light change that is at least one selected from a group consisting of a light intensity change, a light wavelength change, a repetition rate of the light intensity change, a repetition rate of the light wavelength change, a code derived from the light intensity change, and a code derived from the light wavelength change, and
   wherein the pattern of local light change is produced by at least one selected from a group consisting of the strobe light emitted from the remote light emitter and a geometric reflection pattern of the reflective region.

4. The method of claim 2, wherein detecting the reflective light source in the scene comprises:
   detecting a reflective region having total reflection characteristics in the scene; and
   excluding the reflective region having total reflection characteristics from the scene when detecting the reflective light source.

5. The method of claim 1, further comprising:
   analyzing the sequence of images to determine the location of the reflective light source in the at least one image and a movement of the reflective light source across the sequence of images, wherein generating the control signal is further based on the movement;

sending the control signal to a camera device holder where the camera device is mounted;

detecting, in response to sending the control signal, an alignment between the target position and the reflective light source within the field-of-view; and further capturing, using the camera device and in response to detecting the alignment, an additional image of the scene, wherein the selected object appears in the additional image at the target position, wherein the field-of-view of the camera device is changed, by the camera device holder in response to the control signal, in a direction opposite to the pixel position displacement, wherein the alignment corresponds to an overlap between the reflective light source and at least the second pixel position within the field-of-view, and wherein the reflective light source is attached to an object in the scene such that the object overlaps at least the second pixel position in the additional image.

6. The method of claim 5, wherein the sequence of images and the additional image are part of a sequence of video frames in a video recording captured by the camera device.

7. The method of claim 5, wherein the control signal is generated by a tracking controller comprised in at least one selected from a group consisting of a tilt-and-swivel device, a smart phone handheld grip, a single lens reflective (SLR) camera holder, and a control module separate from the tilt-and-swivel device, smart phone handheld grip and SLR camera holder.

8. A system for object tracking, comprising:

a remote light emitter configured to emit a strobe light;

a reflective region of an object, wherein the reflective region is configured to reflect the strobe light generated by the remote light emitter; and a tracking controller configured to:

obtain a sequence of images of a scene, wherein the sequence of images is captured by a single optical sensor of a camera device;

detect, based on a pattern of local light change across the sequence of images captured by the single optical sensor, a reflective light source in the scene;

compare, in response to detecting the reflective light source, a location of the reflective light source in at least one image of the sequence of images and a target position within the at least one image to generate a result; and generate, based on the result, a control signal for changing a field-of-view of the camera device such that the reflective light source aligns with the target position within the field-of-view, wherein the reflective light source emits an object-reflected light produced by the strobe light reflected by the reflective region, wherein the pattern of local light change identifies at least a first pixel position in the at least one image as the location of the reflective light source, wherein the target position corresponds to at least a second pixel position in the at least one image, and wherein the result comprises a pixel position displacement between at least the first pixel position of the reflective light source and at least the second pixel position of the target position.

9. The system of claim 8, wherein the strobe light comprises:

at least one selected from a group consisting of a light intensity change, a light wavelength change, a repetition rate of the light intensity change, a repetition rate of the light wavelength change, a code represented by the light intensity change, and a code represented by the light wavelength change, wherein the pattern of local light change is produced by at least the strobe light emitted from the remote light emitter.

10. The system of claim 9, wherein the reflective region comprises a geometric reflection pattern, and wherein the pattern of local light change is further produced by the geometric reflection pattern of the reflective region.

11. The system of claim 8, further comprising:

a remote visible light emitter configured to emit a visible light, wherein detecting the reflective light source in the scene comprises:

detecting, based on the visible light, a reflective region that reflects the visible light in the scene; and excluding the reflective region that reflects the visible light from the scene when detecting the reflective light source.

12. The system of claim 8, the tracking controller further configured to:

analyze the sequence of images to determine the location of the reflective light source in the at least one image and a movement of the reflective light source across the sequence of images, wherein generating the control signal is further based on the movement;

send the control signal to a camera device holder where the camera device is mounted;

detect, in response to sending the control signal, an alignment between the target position and the reflective light source within the field-of-view; and further capture, using the camera device and in response to detecting the alignment, an additional image of the scene, wherein the selected object appears in the additional image at the target position, wherein the field-of-view of the camera device is changed, by the camera device holder in response to the control signal, in a direction opposite to the pixel position displacement, wherein the alignment corresponds to an overlap between the reflective light source and at least the second pixel position within the field-of-view, and wherein the reflective light source is attached to an object in the scene such that the object overlaps at least the second pixel position in the additional image.

13. The system of claim 12, wherein the sequence of images and the additional image are part of a sequence of video frames in a video recording captured by the camera device.

14. The system of claim 12, wherein the tracking controller is comprised in at least one selected from a group consisting of a tilt-and-swivel device, a smart phone handheld grip, a single lens reflective (SLR) camera holder, and a control module separate from the tilt-and-swivel device, smart phone handheld grip and SLR camera holder.

15. A non-transitory computer readable medium storing instructions for object tracking, the instructions, when executed by a computer processor, comprising functionality for:

capturing a sequence of images of a scene, wherein the sequence of images is captured by a single optical sensor of a camera device;

detecting, based on a pattern of local light change across the sequence of images captured by the single optical sensor, a reflective light source in the scene;

comparing, in response to detecting the reflective light source, a location of the reflective light source in at least one image of the sequence of images and a target position within the at least one image to generate a result; and generating, based on the result, a control signal for changing a field-of-view of the camera device such that the reflective light source aligns with the target position within the field-of-view, wherein the reflective light source emits an object-reflected light.

wherein the pattern of local light change identifies at least a first pixel position in the at least one image as the location of the reflective light source, wherein the target position corresponds to at least a second pixel position in the at least one image, and wherein the result comprises a pixel position displacement between at least the first pixel position of the reflective light source and at least the second pixel position of the target position.

16. The non-transitory computer readable medium of claim 15, wherein the reflective light source is a reflective region of an object, and wherein the object-reflected light is produced by a strobe light emitted from a remote light emitter and reflected by the reflective region.

17. The non-transitory computer readable medium of claim 16, wherein detecting the reflective light source in the scene comprises:

detecting the pattern of local light change that is at least one selected from a group consisting of a light intensity change, a light wavelength change, a repetition rate of the light intensity change, a repetition rate of the light wavelength change, a code derived from the light intensity change, and a code derived from the light wavelength change, and wherein the pattern of local light change is produced by at least one selected from a group consisting of the strobe light emitted from the remote light emitter and a geometric reflection pattern of the reflective region.

18. The non-transitory computer readable medium of claim 15, the instructions, when executed by the computer processor, further comprising functionality for:

analyzing the sequence of images to determine the location of the reflective light source in the at least one image and a movement of the reflective light source across the sequence of images, wherein generating the control signal is further based on the movement.

19. The non-transitory computer readable medium of claim 15, the instructions, when executed by the computer processor, further comprising functionality for:

sending the control signal to a camera device holder where the camera device is mounted;

detecting, in response to sending the control signal, an alignment between the target position and the reflective light source within the field-of-view; and further capturing, using the camera device and in response to detecting the alignment, an additional image of the scene, wherein the selected object appears in the additional image at the target position, wherein the field-of-view of the camera device is changed, by the camera device holder in response to the control signal, in a direction opposite to the pixel position displacement, wherein the alignment corresponds to an overlap between the reflective light source and at least the second pixel position within the field-of-view, and wherein the reflective light source is attached to an object in the scene such that the object overlaps at least the second pixel position in the additional image.

20. The non-transitory computer readable medium of claim 19, wherein the sequence of images and the additional image are part of a sequence of video frames in a video recording captured by the camera device.

\* \* \* \* \*